(12) United States Patent
Yue et al.

(10) Patent No.: US 6,272,517 B1
(45) Date of Patent: Aug. 7, 2001

(54) METHOD AND APPARATUS FOR SHARING A TIME QUANTUM

(75) Inventors: Kelvin K. Yue, Sunnyvale; Daniel A. Stein, Menlo Park; Michael A. Sebrée, Mountain View, all of CA (US)

(73) Assignee: Sun Microsystems, Incorporated, Palo Alto, CA (US)

( * ) Notice: Subject to any disclaimer, the term of this patent is extended or adjusted under 35 U.S.C. 154(b) by 0 days.

(21) Appl. No.: 09/107,690

(22) Filed: Jun. 30, 1998

Related U.S. Application Data (63) Continuation-in-part of application No. 08/962,140, filed on Oct. 31, 1997.

(51) Int. Cl.$^7$ ........................................................ G06F 9/00
(52) U.S. Cl. ............................................ 709/102; 709/100
(58) Field of Search ..................................... 709/100, 101, 709/102, 103, 104, 106, 107, 108, 328, 315, 317, 332; 710/260; 703/26, 27

(56) References Cited

U.S. PATENT DOCUMENTS

| | | | |
|---|---|---|---|
| 5,784,618 | 7/1998 | Toutonghi | 709/107 |
| 5,937,187 | 8/1999 | Kosche et al. | 709/104 |
| 5,987,492 | 11/1999 | Yue | 709/102 |

OTHER PUBLICATIONS

Pawan Goyal, Xingang Guo and Harrick M. Vin, "A Hierarchical CPU Scheduler for Multimedia Operating Systems", University of Texas at Austin, Dept. of Computer Sciences, 8–page document (undated).

Primary Examiner—Majid Banankhah
(74) Attorney, Agent, or Firm—Squire, Sanders & Dempsey L.L.P.

(57) ABSTRACT

A method and apparatus for allowing a first thread to "share" its remaining time quantum with a second thread when the first thread is blocked. A thread may be blocked, for example, if it is waiting for a resource such as a data file or a lock. A thread may also be blocked if it is waiting for an event, such as a user keystroke. If there is a thread on the run queue that "owns" the resource needed by the consumer thread, the blocked consumer thread transfers its right to execute for a remaining time quantum to the owner thread, and the owner thread executes next. If the threads are in a same process, this transfer means that no process context switch is required, since the consumer thread and the owner thread are threads of the same process. In addition, this transfer means that the time before the resource becomes available to the blocked consumer thread will be short. Similarly, if a consumer thread is blocked to await an event, such as a user keystroke, the blocked consumer thread's remaining time quantum are transferred to another thread in that is waiting on the run queue for its turn to execute. Again, if the threads are in a same process, this transfer avoids having to perform a context switch between processes.

32 Claims, 10 Drawing Sheets

FIG. 1
MULTI-THREADED APPLICATIONS
SHARING A SINGLE PROCESSOR

FIG. 2
MULTI-THREADED APPLICATIONS
SHARING MULTIPLE PROCESSORS

FIG. 4a
INITIAL EXECUTION OF A MULTI-THREADED APPLICATION

FIG. 4c
TIME QUANTUM TRANSFER BETWEEN THREADS

FIG. 6
TIME QUANTUM TRANSFER BETWEEN THREADS

METHOD AND APPARATUS FOR SHARING A TIME QUANTUM

This application is a continuation-in-part of U.S. application Ser. No. 08/962,140 of Yue, entitled "Method and Apparatus for Processor Sharing," filed Oct. 31, 1997, which is herein incorporated by reference in its entirety.

FIELD OF THE INVENTION

This application relates to operating systems and, specifically, to a method and apparatus that allows thread of a process to share a remaining quantum of processor time allotted to it with other threads.

BACKGROUND OF THE INVENTION

Most modern computer systems are multi-tasking systems. That is, they allow more than one "job" or "process" to be active at a given time. Since there is often only one processor in the system (or a number of processors less than the number of jobs/processes), it becomes necessary for the jobs/processes to share the processor resources. In a shared processor system, a processor spends some time executing part of a first job/process before switching to execute part of another job/process. Thus, to a human user, it appears that more than one job/process is being executed at a given time.

Some computer systems execute "multi-threaded" computer programs in which multiple "threads" of a process can be executing at the same time. Multi-threading adds an extra note of complexity to the operating system and to processor sharing.

In at least one implementation of the Solaris operating system (available from Sun Microsystems, Inc.), a highest priority job will run for a period of time (called a "time quantum") and then its priority is redetermined. There are currently four different scheduling classes that define the priorities of the applications in a conventional Solaris system: Real Time (RT); System (SYS); Interactive (IA), and Timesharing (TS). If, after its execution, a job still has the highest priority in the system, it is allowed to run for another period of time (e.g., between 20 to 200 milliseconds), after which the priority is redetermined again. If it is no longer the highest priority job in the system after the redetermination, then a job that has a higher priority gets to run. Unfortunately, if a job maintains a highest priority, other applications do not always get a chance to execute.

Many conventional operating systems use time-sharing processor-scheduling strategies that schedule threads independently. In such a system, each thread is assigned a priority and a time quantum and is put on a run queue to wait for its turn to use the processor. When a processor is available, it picks the thread with the highest priority from the run queue and executes it. The thread is allowed to use the processor for the duration of the time quantum. When the thread uses up its assigned quantum, the thread's priority is recalculated, a new time quantum is assigned and the thread is put back onto the run queue. The processor then picks the next highest priority thread from the run queue and begins to execute it again.

During its execution on a processor, a thread often requires an event to occur or some data or resource to be available before the thread can continue its computation. An example of an event might be a key stroke from a user or availability of a record from a file. Similarly, a thread may have to wait for availability of data, such as access to a lock that is shared with another thread. A thread that needs a resource is called a "consumer thread." When the resource or data is not available or when the event has not occurred, and the consumer thread needs to wait, the consumer thread is called a "blocked consumer thread." If the event or data is not immediately available, the processor does not simply allow the thread to wait idly while occupying the processor. Instead, even though the blocked consumer thread is not done with its time quantum, the processor puts the blocked thread on a sleep queue and picks another thread to execute. This new thread has its own preassigned time quantum. Use of a sleep queue allows a more efficient use of the processor resources. When the awaited event occurs or the awaited data or resource becomes available, the processor wakes the blocked consumer thread and puts it on the run queue to wait for its turn to use the processor.

Although the practice of allowing a thread to "sleep" while blocked allows a more efficient use of the processor, it incurs extra overhead because the processor has to take time to pick the next highest thread to execute. In addition, this approach can limit the performance of certain multi-threaded applications. Assume, for example, that a multi-threaded application has two threads: thread A and thread B, which share a common lock executing in a system with one processor. Thread A holds the lock and is waiting on the run queue for the processor. Thread B is executing on the processor, but requires the lock to continue. The lock is not available because thread A is holding it. Thus, thread B is blocked, to wait for the lock. When thread B is blocked, the processor picks a thread having a highest priority from the run queue.

Unfortunately, the thread that the processor picks may not be thread A. The thread on the run queue having the highest priority may not even be for the same process as threads A and B. If the processor picks a thread from a different process, the processor will have to perform an inefficient and costly context switch (to execute threads of a new process). When thread A finally does run, another context switch will be required (to execute threads of the process of threads A and B). Even worse, by the time thread A (which has the lock) executes, thread B (which needs the lock) may not be a highest priority process on the run queue and may not execute right away. This type of scenario demonstrates one reason why multi-threaded applications can perform poorly in a shared execution system.

SUMMARY OF THE INVENTION

A described embodiment of the present invention provides a method and apparatus for allowing a thread to "share" its time quantum with other threads when the thread is blocked. A thread may be blocked, for example, if it is waiting for a resource such as a data file or a lock. A thread may also be blocked if it is waiting for an event, such as a user keystroke.

A "consumer" thread is defined as a thread that needs to consume a resource or to wait for an event. In a first embodiment of the present invention, when a thread is to be blocked, if there is another thread waiting for execution that is from the same process and that "owns" the resource needed by the blocked consumer thread, the blocked consumer thread transfers its right to execute for its remaining time quantum to the owner thread, and the owner thread executes next. This transfer means that no process context switch is required, since the blocked consumer thread and the owner thread are threads of the same process. In addition, this transfer means that the time before the resource becomes available to the blocked consumer thread will be short.

In another embodiment, the owner thread may belong to a different process than the first thread, if the two processes are both owned by the same user. In this embodiment, the first thread shares its remaining time quantum with the second thread, although a context switch may be needed. In another embodiment, the owner thread may belong to a different process than the first thread and the two processes may be owned by different users. If the system defines the first user as being able to share resources with the second user, the first thread shares its time remaining time quantum with the second thread, although a context switch may be needed.

In another embodiment of the present invention, when a thread is blocked, if the owner thread is also blocked, the blocked consumer thread transfers its right to execute for its remaining time quantum to another thread that is not the owner thread, but that is still in the same process. This transfer means that no process context switch is required, since the blocked consumer thread and the thread to which the remaining time quantum is transferred are threads of the same process.

In another embodiment, in the case where the owner thread is blocked, the thread that is not the owner thread may belong to a different process than the first thread, if the two processes are both owned by the same user. In this case, the blocked thread shares its remaining time quantum with the thread that is not the owner thread, although a context switch may be needed. In another embodiment, the thread that is not the owner thread may belong to a different process than the first thread and the two processes may be owned by different users. If the system defines the first user as being able to share resources with the second user, the first thread shares its remaining time quantum with the second thread, although a context switch may be needed.

Similarly, if a consumer thread is blocked to wait for an event, such as a user keystroke, the remaining portion of the consumer thread's time quantum is transferred to another thread of the same process that is waiting on the run queue for its turn to execute. This second thread may have a highest priority or may be chosen according to any other appropriate criteria. Again, this transfer avoids having to perform a context switch between processes.

In another embodiment, when the blocked thread is waiting for an event, the blocked thread may share its remaining time quantum with another thread, if the two processes are both owned by the same user. In this case, the blocked thread shares its remaining time quantum with the second thread, although a context switch may be needed. In another embodiment, the second thread may belong to a different process than the first thread, and the two processes may be owned by different users. If the system defines the first user as being able to share resources with the second user, the first thread shares its remaining time quantum with the second thread, although a context switch may be needed.

In accordance with the purpose of the invention, as embodied and broadly described herein, the invention relates to a method of sharing a time quantum between threads in a process, comprising the steps, performed by the data processing system, of: determining that a first thread, which is currently being executed by a processor and which has an associated time quantum, is blocked; determining a next thread to be executed by the processor; and transferring unused time in the time quantum of the first thread to the next thread to be executed.

In further accordance with the purpose of the invention, as embodied and broadly described herein, the invention relates to method of sharing a time quantum between a plurality of threads in a data processing system, comprising the steps, performed by the data processing system, of: initially assigning a number of tickets to the plurality of threads; assigning an initial priority to a thread of each of the plurality of processes in accordance with the number of tickets assigned to the threads; and executing the respective threads of the plurality of processes in an order indicated by the tickets assigned to the plurality of threads, so that the proportion of execution time between any two of the threads is the same as the proportion between the number of tickets of the two processes associated with the threads, the execution step including the substeps of: determining that a first thread, which is currently being executed and which has an associated time quantum, is blocked; determining a next thread to execute; and transferring unused time in the time quantum of the first thread to the next thread to execute.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF PREFERRED EMBODIMENTS

Reference will now by made in detail to preferred embodiments of the invention, examples of which are illustrated in the accompanying drawings. Wherever convenient, the same reference numbers will be used throughout the drawings to refer to the same of like parts.

I. Overview

Figure 1:
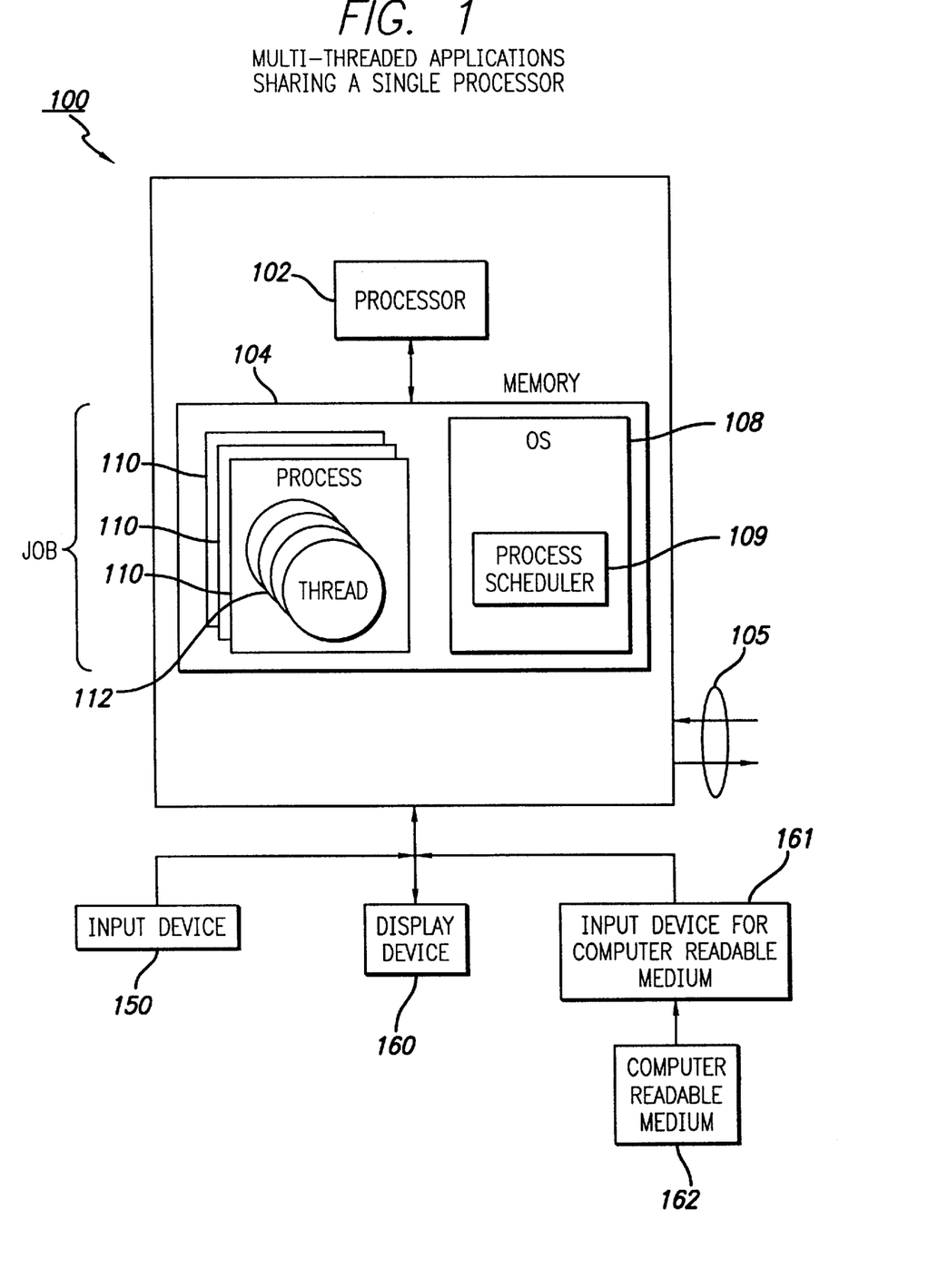
FIG. 1 shows an example of a plurality of multi-threaded applications executing on a data processing system having a single processor, in accordance with a preferred embodiment of the present invention.
Figure 2:
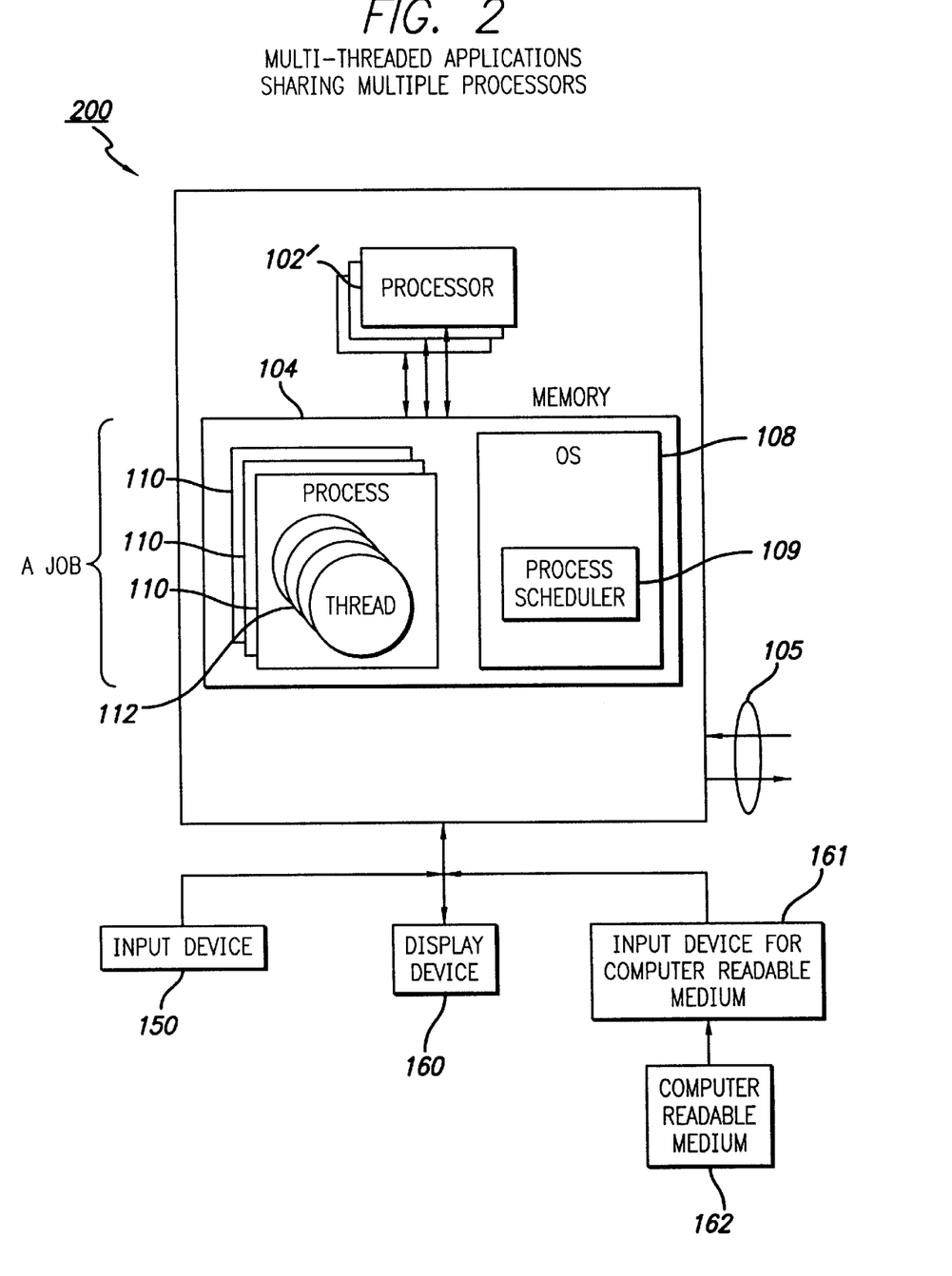
FIG. 2 shows an example of a plurality of multi-threaded applications executing on a data processing system having multiple processors, in accordance with another preferred embodiment of the present invention.

The present invention can be implemented on a wide variety of data processing systems, including systems that execute multi-threaded applications and that include a single processor or multiple processors. FIGS. 1–2 show respective examples of each of these systems.

The present invention can be implemented in any appropriate data processing system that includes multi-threading or similar concepts. Because the invention allows a thread that is blocked to share its unused, allotted execution time with other threads, the present invention improves the efficiency of execution of threads in the process and avoids undesirable process context switches and delays in executing threads (when the threads sharing time quantum are in the same process).

Figure 3A:
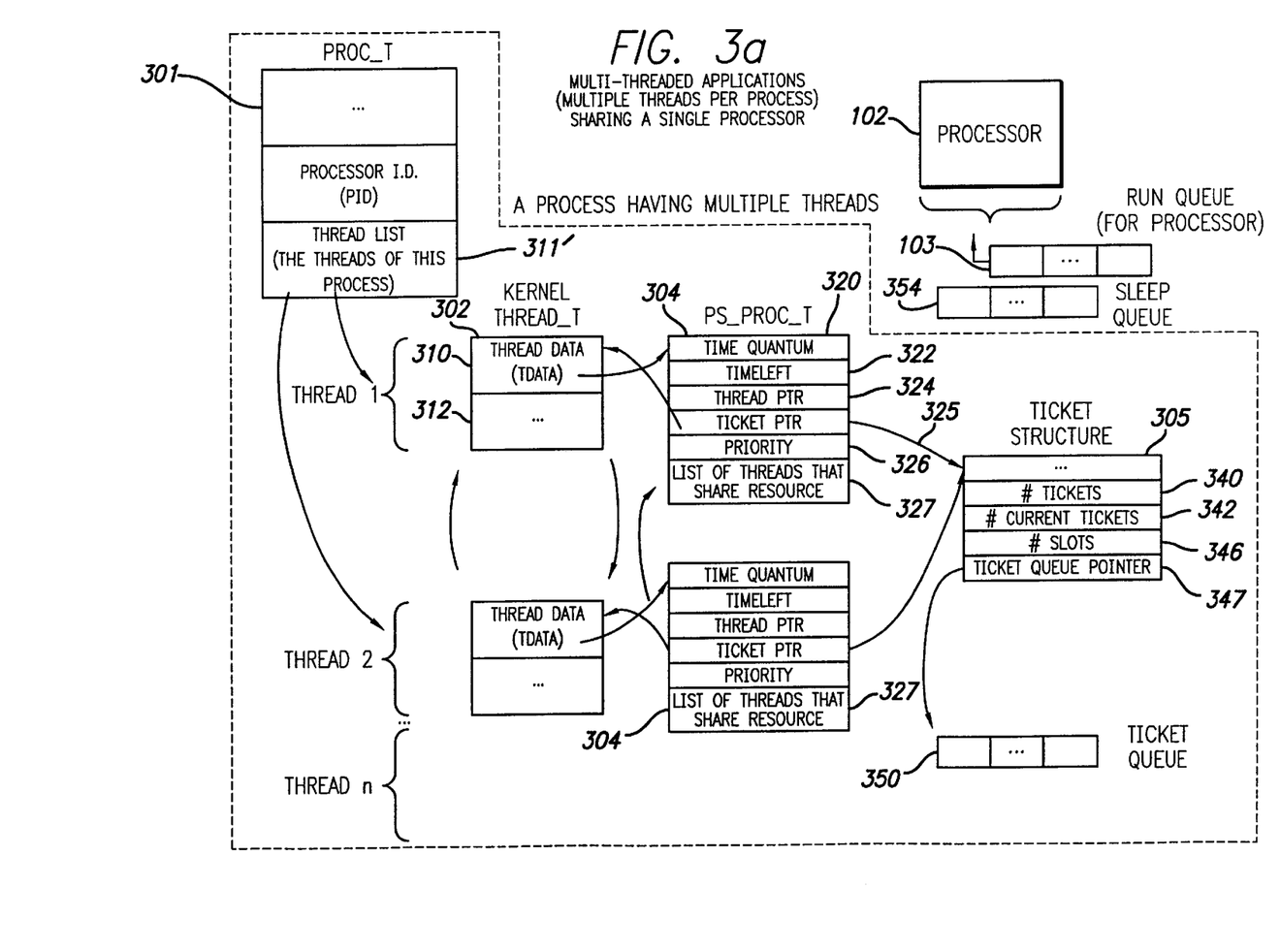
FIG. 3(a) shows an example of a data structure used to implement a embodiment of the present invention in a system where multi-threaded applications share one processor (such as the system of FIG. 1) using a ticket metaphor.
Figure 3B:
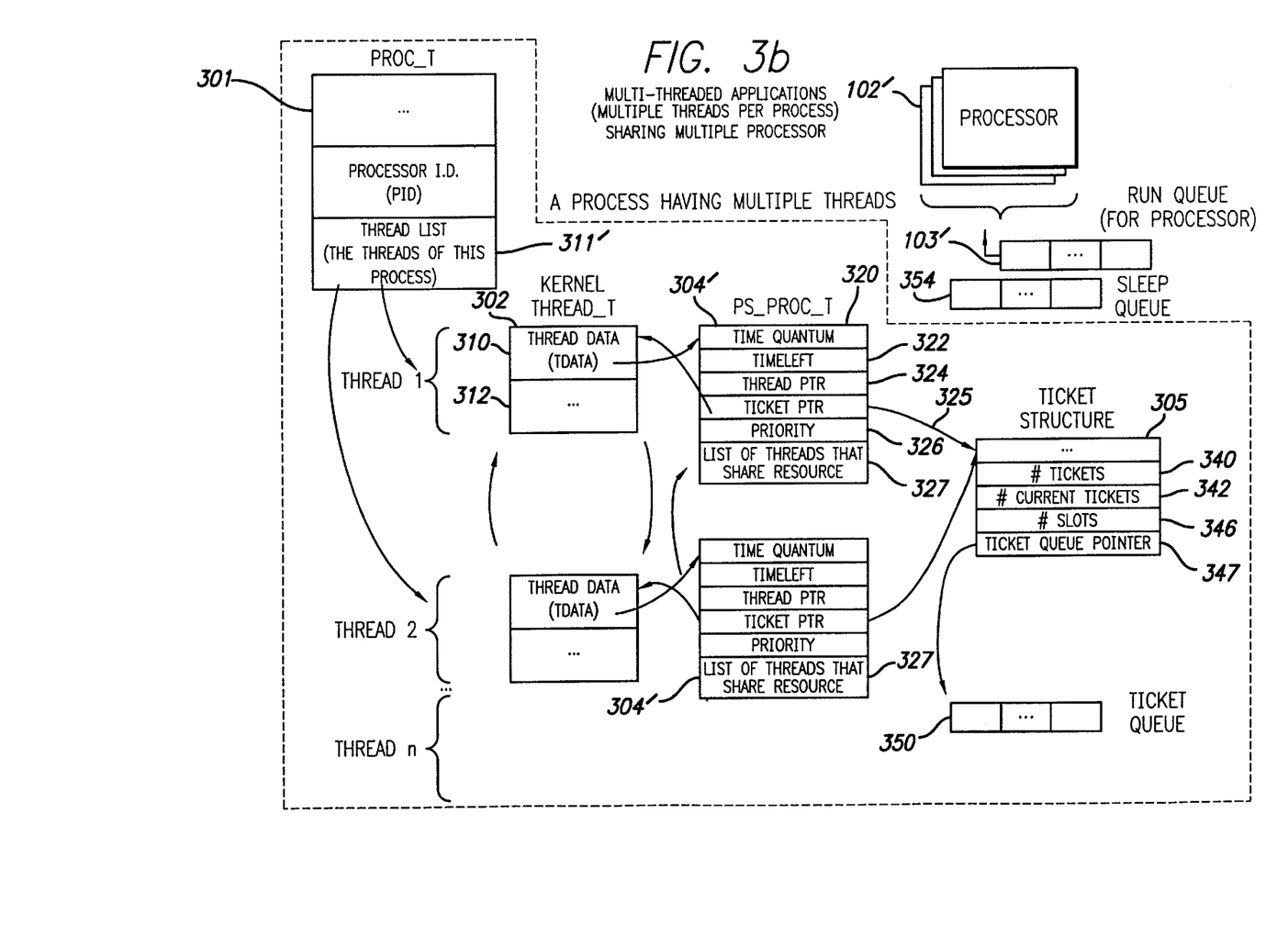
FIG. 3(b) shows an example of a data structure used to implement a preferred embodiment of the present invention in a system where multi-threaded applications share more than one processor (such as the systems of FIG. 2) using a ticket metaphor.
Figure 4A:
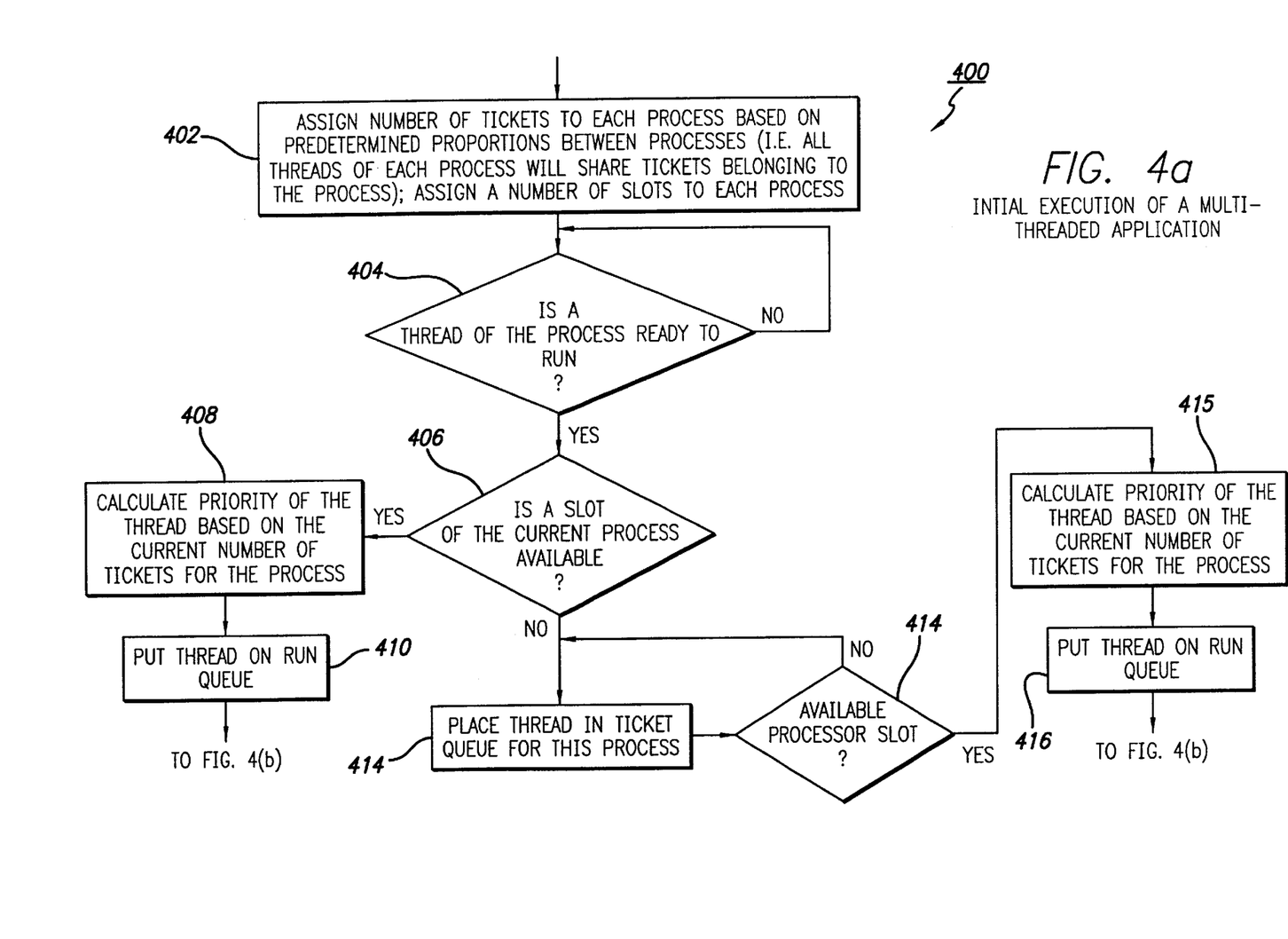
FIGS. 4(a) and 4(b) are flow charts describing a method of the present invention in a system where multi-threaded applications share at least one processor (such as the system of FIGS. 1 or 2) using a ticket metaphor.
Figure 4B:
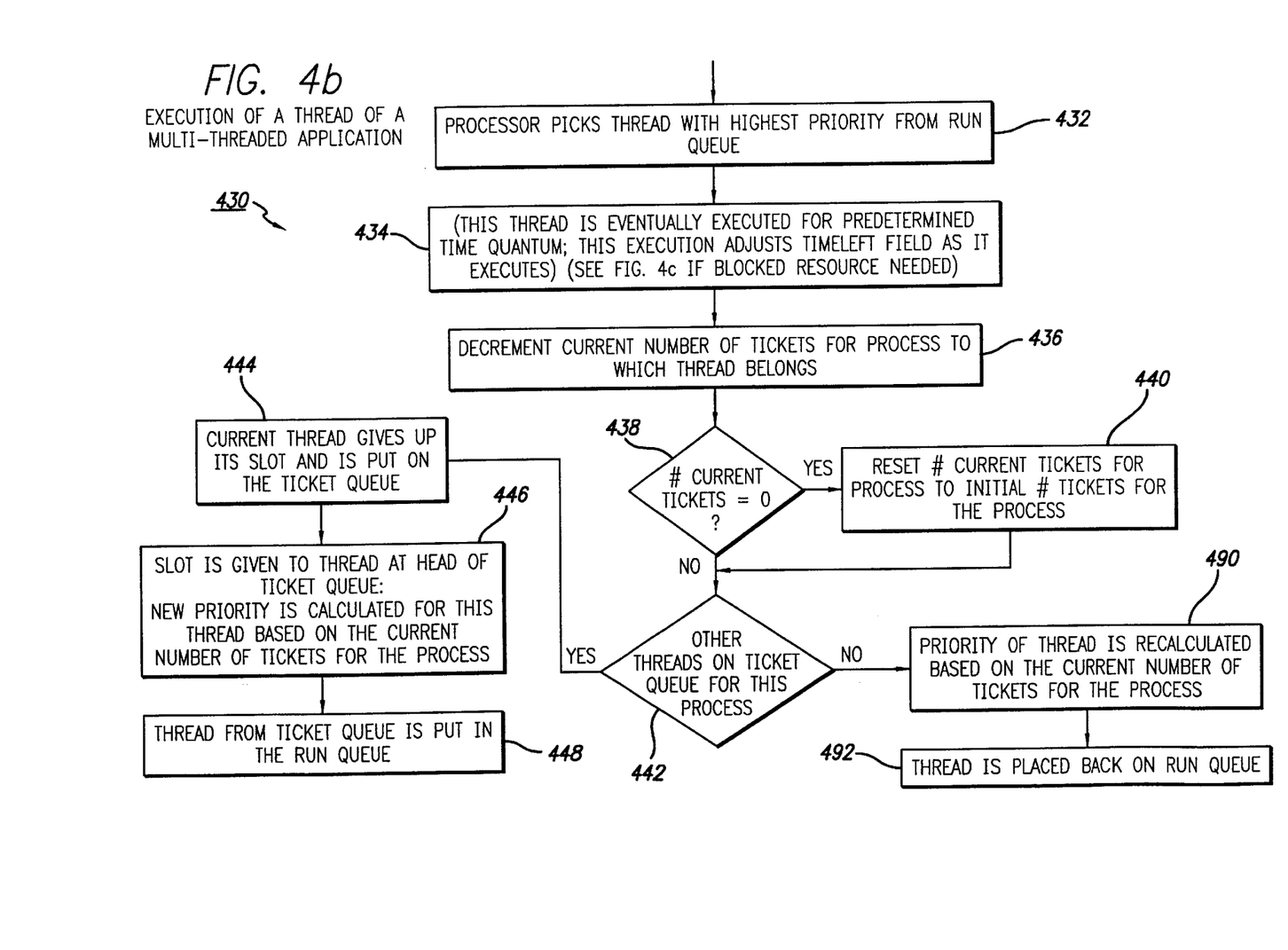
Figure 5:
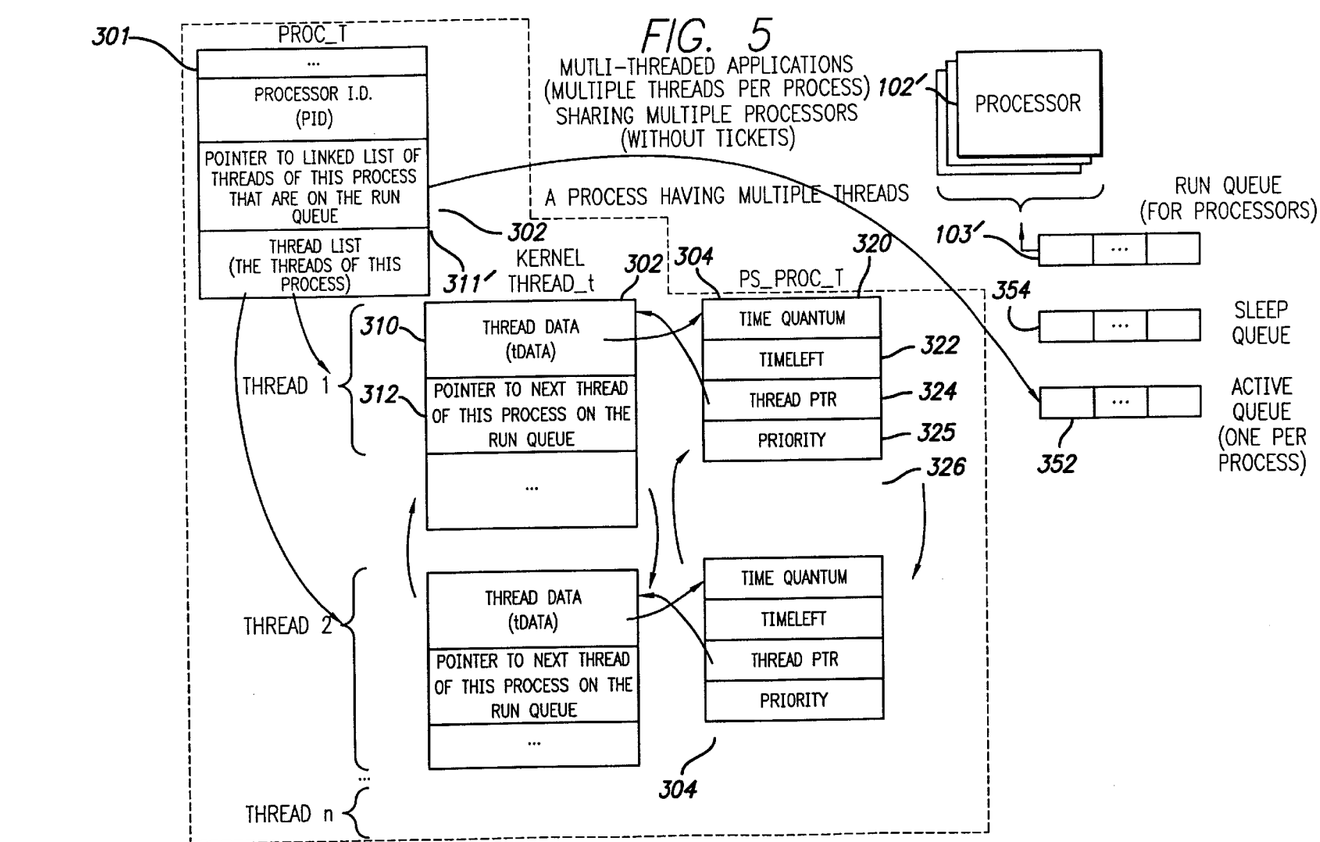
FIG. 5 shows an example of a data structure used to implement a preferred embodiment of the present invention in a system where multi-threaded applications share more than one processor (such as the system of FIG. 2) without implementing the ticket metaphor.
Figure 6:
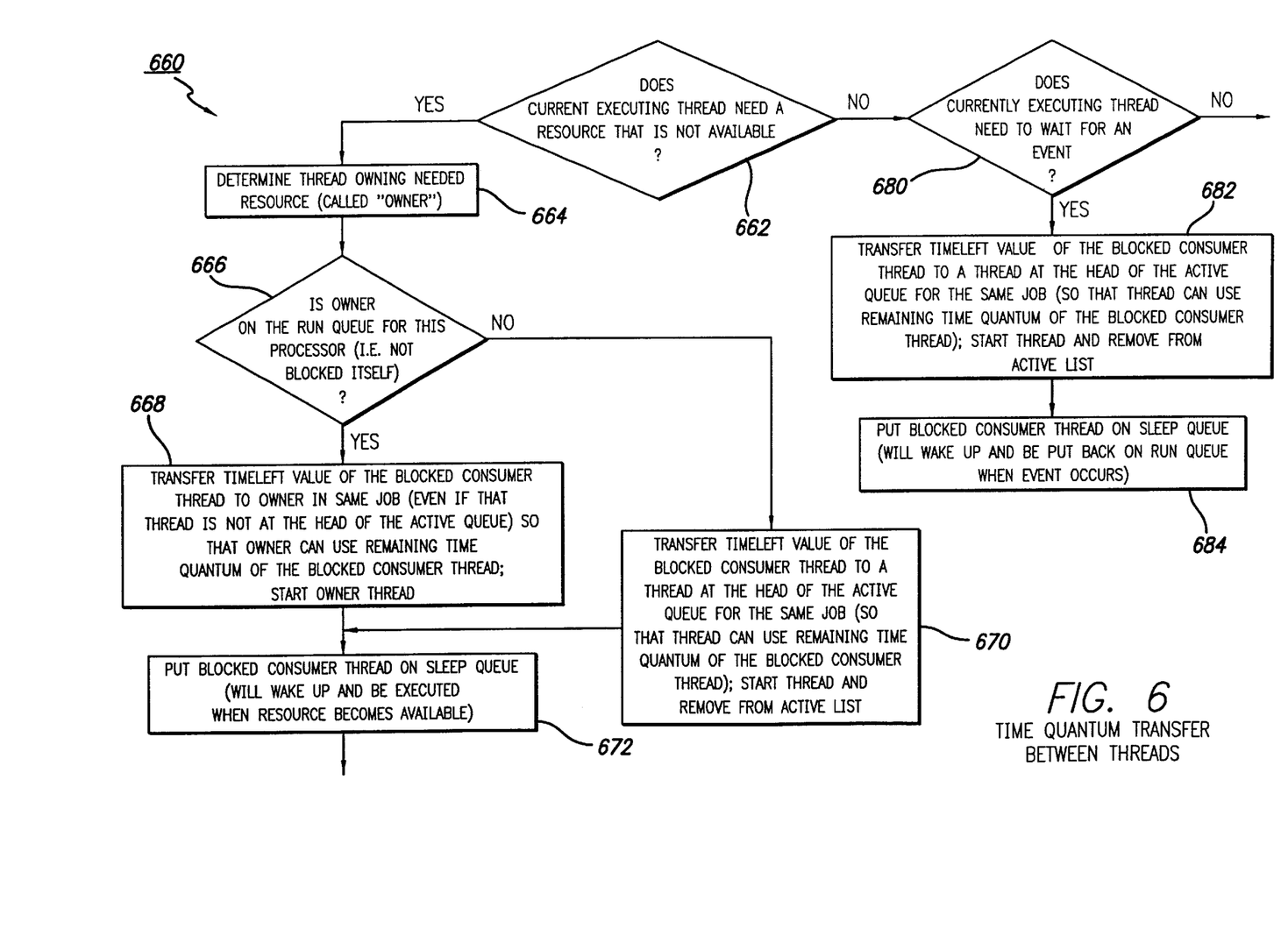
FIG. 6 is a flowchart describing a method performed when an executing thread is blocked and transfers its remaining execution time to another thread in the same process, without implementing the ticket metaphor.

FIGS. 3 and 4 show an embodiment of the present invention that allows sharing of execution rights among threads using a "ticket" metaphor, as described below. FIGS. 5 and 6 show an embodiment of the present invention that does not use the "ticket" metaphor. Thus, the present invention can be used in a variety of operating system environments, and can be used in contexts that do or do not use a "ticket" metaphor for sharing processor resources without departing from the spirit and scope of the present invention.

FIG. 1 is a block diagram of a data processing system 100 having a single processor 102 and a memory 104. Memory 104 includes one or more multi-threaded applications (also called "processes") 110, at least one of which contains a plurality of threads 112. Memory 104 also includes an operating system (OS) 108, which includes process scheduler software 109. The steps of the described embodiment of the present invention are performed when instructions in process scheduler software 109 are executed by processor 102. The present invention allows the threads 112 of each multi-threaded application/process 110 to share processor 102, as described below.

Data processing system 100 (and other data processing systems discussed herein) can be, for example, a SPARC chip based system, an Ultra server, or an Enterprise server (all of which are available from Sun Microsystems, Inc.). Data processing system 100 can also be any other appropriate data processing system.

Operating system 108 can be, for example, a variation of the Unix operating system that has been modified to incorporate the present invention. UNIX is a registered trademark in the United States and other countries and is exclusively licensed by X/Open Company Ltd. Operating system 108 can be, for example, a variation of the Solaris operating system, available from Sun Microsystems, Inc. that incorporates the functionality of the present invention.

FIG. 1 also includes an input device 150, such as a keyboard, mouse, touchpad, touch screen, etc. FIG. 1 further includes a display device, such as a display screen, etc. FIG. 1 further includes a computer readable medium 162 and an input device 161 for computer readable medium. Computer readable medium 162 includes, for example, a floppy disk drive, CD ROM reader, or DVD reader, that reads computer instructions stored on a computer readable medium, such as a floppy disk, a CD ROM, or a DVD drive. FIG. 1 also includes network connections 105, which can be present in at least some implementations of the system 100.

In the following discussion, it will be understood that the steps of methods and flow charts discussed preferably are performed by processor 102 (or another appropriate processor) executing instructions stored in memory 104 (or other appropriate memories). It will also be understood that the invention is not limited to any particular implementation or programming technique and that the invention may be implemented using any appropriate techniques for implementing the functionality described herein. The invention is not limited to any particular programming language or operating system.

The instruction in memory may be read into memory from a computer-readable medium. Execution of sequences of instructions contained in memory 104 causes processor 102 to perform the process steps described herein. In alternative embodiments, hard-wired circuitry may be used in place of or in combination with software instructions to implement the invention. Thus, embodiment of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

It will be understood that the present invention can also be performed in a distributed data processing system, where the processor(s) and memory are located in different machines. It will also be understood that the present invention can also be implemented in a distributed system, where the processes, threads, and/or processors are not all in the same computer.

A person of ordinary skill in the art will understand that memory 104 also contains additional information, such as application programs, operating systems, data, etc., which are not shown in the figure for the sake of clarity. It also will be understood that data processing system 100 (or any other data processing system described herein) can also include numerous elements not shown, such as disk drives, keyboards, display devices, network connections, additional memory, additional CPUs, LANs, input/output lines, etc.

FIG. 2 is a block diagram of a data processing system 200 having multiple processors 102' and a memory 104. Memory 104 includes one or more multi-threaded applications 110 (also called a "process"), at least one of which contains a plurality of threads 112. Memory 104 also includes an operating system (OS) 108, which includes process scheduler software 109. The steps of the described embodiment of the present invention are performed when instructions in process scheduler software 109 are executed by one or more of processors 102'. The present invention allows the threads 112 of each multi-threaded application/process 110 to proportionally share processors 102', as described below.

II. Multi-threaded Applications

FIG. 3(a) shows an example of a data structure used to implement a preferred embodiment of the present invention in a single processor system capable of executing multi-threaded applications (such as the system of FIG. 1). FIG. 3(b) shows an example of a data structure used to implement a preferred embodiment of the present invention in a multi-processor system capable of executing multi-threaded applications (such as the system of FIG. 2). FIGS. 4(a) and 4(b) are flow charts showing steps using the data structures of FIGS. 3(a) or 3(b).

In the data structures of FIGS. 3(a) and 3(b), multiple threads in each application/process "share" the tickets of their process between them via a ticket data structure 305. It should be understood that the systems of FIGS. 3(a) and 3(b) can also include single-threaded applications (not shown), in addition to the multi-threaded applications. This "ticketing" system is described in more detail in U.S. application Ser. No. 08/962,140 of Yue, entitled "Method and Apparatus for Processor Sharing," filed Oct. 31, 1997, which is herein incorporated by reference.

While each thread has its own priority 326, the tickets are held at the process level in fields 340 and 342 of ticket structure 305. Ticket data structure 305 also includes a #slots field 346 and a ticket queue pointer 347. The #slots field 346 indicates a number of processor slots assigned to each process. In the case of a single processor system, the number of slots is always "1". A multiple processor system can have any number of slots less than or equal to the number of processors 102'. Ticket queue pointer 347 points to a ticket queue 350, whose function is to hold threads of a process that are waiting for a processor slot to become available. Threads to be executed are taken off ticket queue 350 and placed on run queue 103 (or 103') for execution by processor (s) 102 (or 102').

FIG. 4(a) is a flow chart 400 showing steps performed in connection with the multi-threaded applications of FIGS. 3(a) and 3(b) sharing single processor 102 or multiple processors 102'. In step 402 of FIG. 4(a), a number of tickets and a number of slots are assigned to each process. The priority of a thread is assigned based on the number of current tickets in the ticket structure 305 of its process when the priority is assigned. Thus, threads of a same process can have different priorities.

When a thread wants to use a processor 102, 102' (see step 404), it first checks to determine whether there is an available processor slot (step 406). If there is an available slot (i.e., no other thread is waiting in ticket queue 350), a priority is determined for the thread in step 408. This priority is placed in field 326 of the thread's ps_proc_t data structure 304 and the thread is placed in run queue 103 for execution in step 410. Otherwise (if there are no available processor slots), the thread is placed in ticket queue 350 for this process (step 412). When a slot becomes available in step 414, a thread is taken off ticket queue 350 and its priority 326 is calculated in step 415 based on the current number of tickets held by its process. The thread is then placed in run queue 103 for execution in step 416.

FIG. 4(b) is a flow chart 430 showing steps for executing a thread after the thread is put on the system run queue 103 for execution by processor 102. The thread is executed for the predetermined time quantum specified in the time quantum field 320 in step 434. As the thread executes, the "timeleft" field 322 is decremented for each time unit of execution. Thus, the time quantum field is a constant value and the timeleft field is regularly decremented as the thread executes. The timeleft field 322 holds the amount of execution time remaining for the thread during its current chance to use the processor. After the thread completes execution, the #current tickets 342 for the process of the executing thread is reduced by "1" in step 436. If the number of tickets held is "0" in step 438, the number of tickets is reset to the initial value for the process in step 440 and control passes to step 442. Otherwise control passes directly to step 442.

In step 442, if other threads are on the ticket queue 350 for this process, the current thread gives up its slot in step 444 and is put back on ticket queue 350. Its slot is given to the thread at the head of ticket queue 350 and a new priority is calculated for this new thread based on the number of current tickets 342 for the process in step 446. This new thread (with its newly assigned priority) is placed on run queue 103 for execution in step 448.

If, on the other hand, in step 442 there are no threads waiting in the ticket queue 350 when the current thread finishes execution, the priority of the current thread is recalculated based on the number of current tickets for the process in step 490 and the current thread is placed back on run queue 103 in step 492 for execution. Note that steps 446 and 490 recalculate a priority of a thread based on the number of tickets currently held by the process to which the thread belongs.

Because the system of FIG. 3(b) includes multiple processors 102', each process is assigned a number 346 of "slots" equal, for example, to the number of processors in the system. Other implementations of the present invention may use other numbers of slots. For example, the number of slots could be smaller than the number of processors in the system in order to reduce the concurrency of execution of processes. In the described embodiment, if there are two processors in the system, the number of slots would be "2". Thus, for example, if there are only two processors 102' in the system and a process has ten threads, only two threads of the process at a time can be input to the system run queue. The rest of the threads will wait on ticket queue 350.

The previous paragraphs discuss a "ticket" metaphor used to apportion execution time among multiple threads. It will be understood that other methods can be used to apportion execution times among threads and that the above-described "ticket" metaphor is not necessarily a part of systems implementing the present invention. The following paragraphs describe how threads can share their assigned execution time quantum.

Figure 4C:
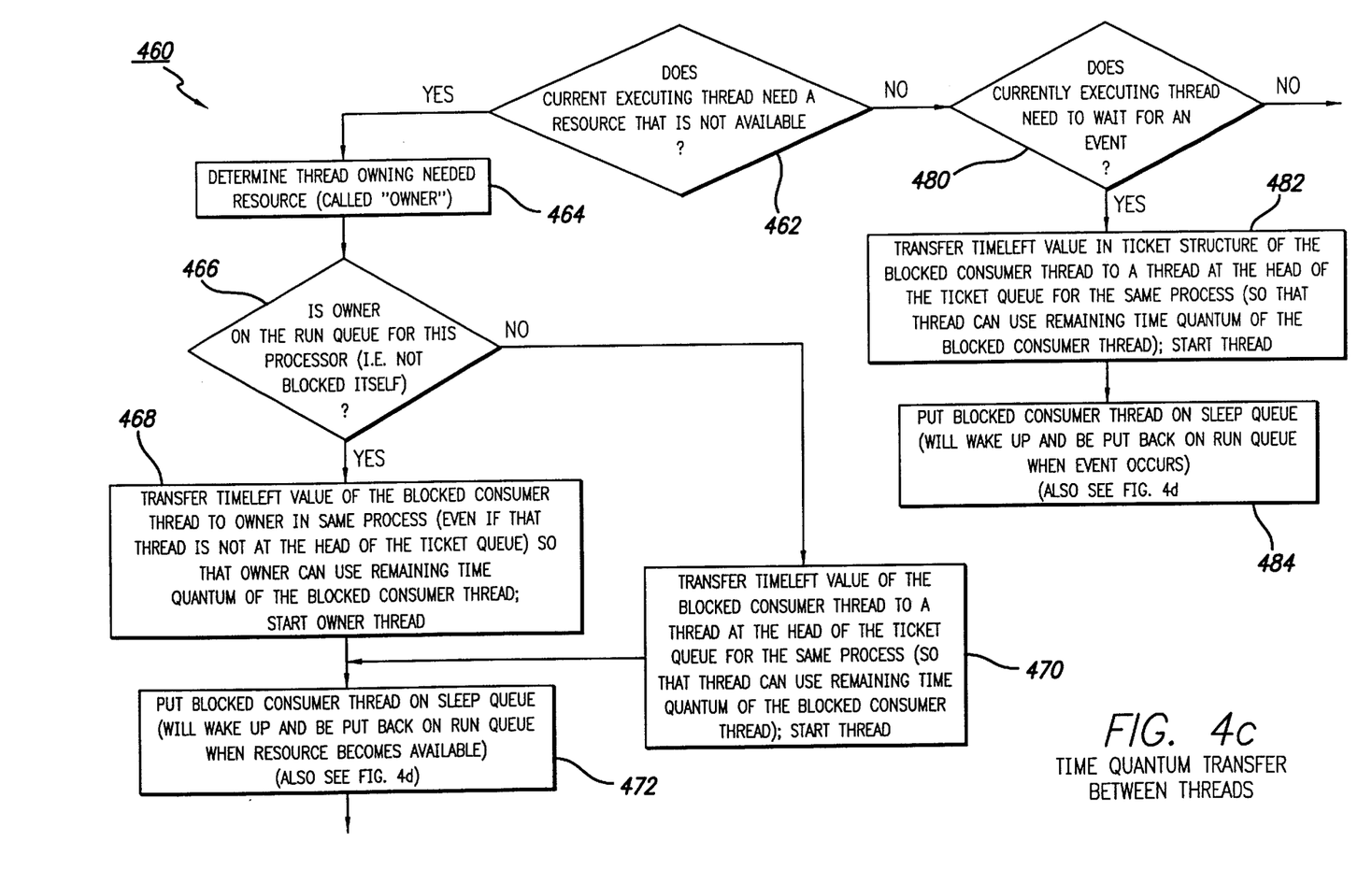
FIG. 4(c) is a flowchart describing a method performed when an executing thread is blocked and transfers its remaining time quantum to another thread.

FIG. 4(c) is a flowchart 460 describing a method performed when an executing consumer thread is blocked and transfers its remaining time quantum in timeleft field 322 to another thread in the same process. The "currently executing thread" of step 462 is the thread that is blocked. Steps 462 through 472 are performed when the consumer thread is waiting for a resource. Steps 480 through 484 are performed if the consumer thread is waiting for an event.

Step 464 determines which of the existing threads owns the needed resource using the field 327. This thread is called the "owner." In step 466, if the owner is on the run queue 103 for this process (i.e., if the owner is not blocked itself) then, in step 468, the timeleft 322 of the blocked consumer thread is transferred from that thread's ps_proc_t data structure 304 to timeleft field 322 of the ps_proc_t data structure of the owner thread. This transfer occurs even if the owner thread does not have the highest priority of the threads on the run queue. The owner thread is then started, so that it can immediately use the remaining time quantum in timeleft field 322 of the blocked consumer thread. Because the owner thread is part of the same process as the consumer thread, no process context switch is required.

If, on the other hand, in step 470, the owner itself is blocked, the remaining time quantum of the blocked consumer thread is transferred to the thread at the head of the same process of the run queue. The thread is then started, so that it can immediately use the remaining time quantum of the blocked consumer thread. Because the newly started thread is part of the same process as the consumer thread, no process context switch is required. This transfer is accomplished, for example, by copying the timeleft field 322 from the blocked consumer thread to the second thread. Alternately, the timeleft field 322 of the first thread can be added to the timeleft field 322 of the second thread.

Following both steps 468 and 470, the blocked consumer thread is placed on the sleep queue 354. The thread will be restarted when its resource becomes available. An example of this occurrence is shown in FIG. 4(d).

Step 480 determines whether the currently executing consumer thread needs to wait for an event (as opposed to a blocked resource). If so, in step 482, the remaining time quantum in timeleft field 322 of the blocked consumer thread is transferred to the ps_proc_t data structure 304 of a thread at the head of the run queue 103. This transfer is accomplished, for example, by copying the timeleft field 322 from the blocked consumer thread to the second thread. Alternately, the timeleft field 322 of first thread can be added to the timeleft field 322 of the second thread. The thread is then started, so that it can immediately use the remaining time quantum of the blocked consumer thread. Because the newly started thread is part of the same process as the consumer thread, no process context switch is required. Following step 482, the blocked consumer thread is placed on the sleep queue in step 484. The thread will be restarted when its event occurs. An example of this occurrence is shown in FIG. 4(d).

Figure 4D:
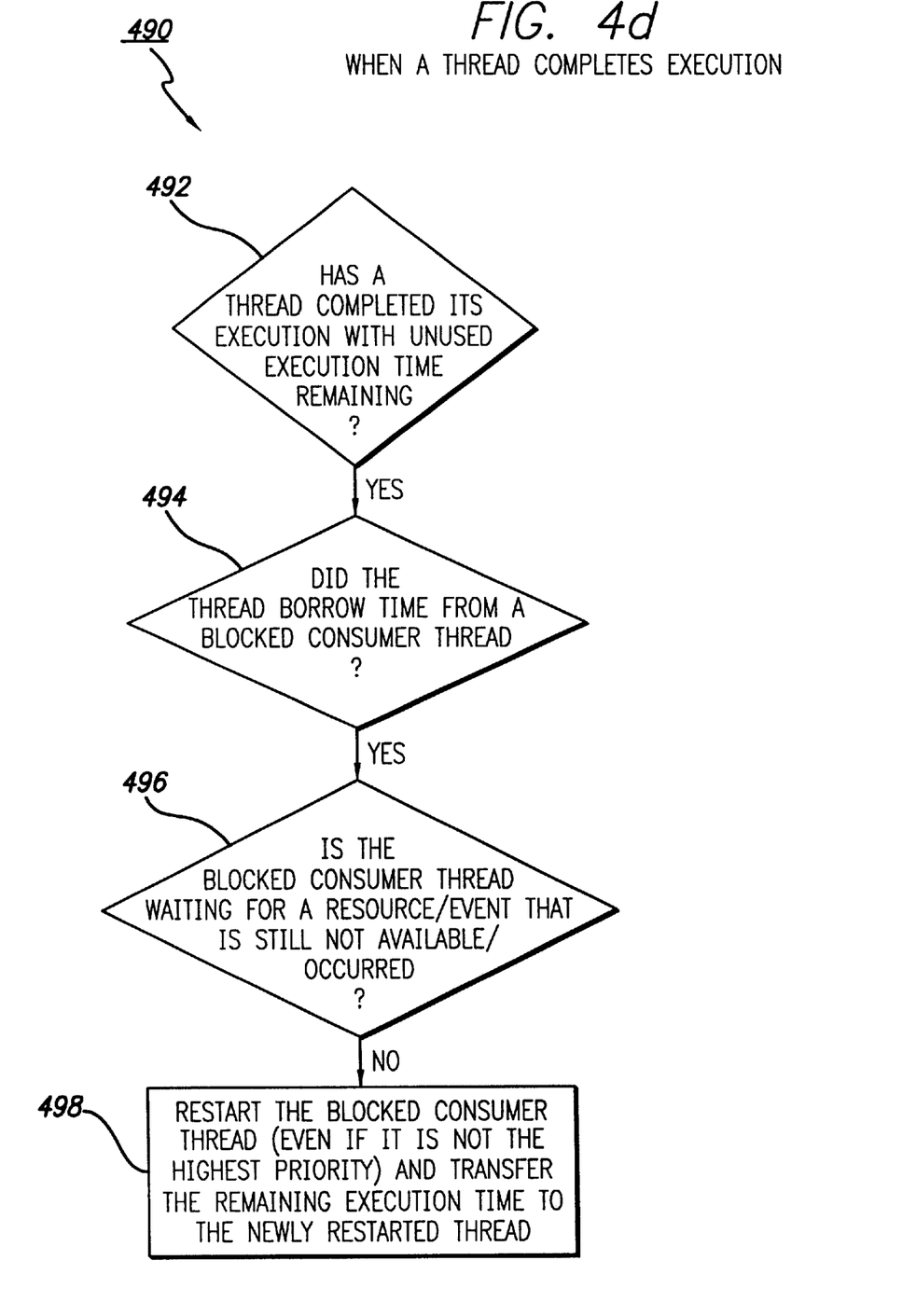
FIG. 4(d) is a flow chart describing a method performed when a thread to which time quantum was transferred completes with time still remaining.

FIG. 4(d) is a flow chart 490 describing a method performed when a thread to which a remaining time quantum was transferred completes with time still remaining. If, in step 492, a thread completes its execution with unused execution time remaining; if, in step 494, the thread previously borrowed time from a thread that is currently blocked; and if, in step 496, the blocked consumer thread is waiting for data or an event that is available (i.e., data that is not blocked or an event that has occurred) then, in step 498, the consumer thread is restarted and the remaining time quantum in timeleft field 322 is transferred to the newly restarted thread.

FIG. 5 shows an example of a data structure used to implement an embodiment of the present invention in a system where multi-threaded applications share more than one processor (such as the systems of FIG. 2) but that does not use the ticket metaphor. Note that, in contrast to the data structure of FIG. 3, the data structure of FIG. 5 does not include a ticket structure allowing threads of a single process to share their right to execution. In this implementation of the present invention, the data structure of FIG. 5 includes an "active queue" 352 for each process. The proc_t structure 301 of each process points to the active queue 352 for that process. Active queue 352 is a list of all threads of the process that are currently on the run queue. Thus, the thread of the process that has the highest priority in the run queue will be at the head of the active queue for that process.

FIG. 6 is a flowchart 660 describing a method performed when an executing consumer thread is blocked and transfers its remaining execution time to another thread in the same process, in a system that does not use the ticket metaphor. FIG. 6 is similar to FIG. 4(c), except that, in steps 670 and 682, the time quantum in field 322 remaining for the blocked consumer thread is transferred to a thread at the head of the active queue 352 for the process to which the blocked consumer thread belongs. This transfer is accomplished, for example, by copying the timeleft field 322 from the blocked consumer thread to the second thread. Alternately, the timeleft field 322 of the first thread can be added to the timeleft field 322 of the second thread.

Thus, in the described embodiment of the present invention, when a consumer thread is blocked, its remaining execution time is assigned to another thread in the same process. This thread can be, for example, a thread that controls a resource that is blocking the consumer thread. The thread in the same process can also be a thread in the same process having a highest execution priority. Several implementations of the present invention have been discussed herein. A first implementation is described in a system where threads of a process share "tickets" among themselves. A second implementation is described in a system where each process keeps track of its threads that are waiting to execute using an active queue or an active list. In either case, the consumer thread that is blocked transfers its unused, allotted execution time to another thread in the same process.

While the invention has been described in conjunction with a specific embodiment, it is evident that many alternatives, modifications and variations will be apparent to those skilled in the art in light of the foregoing description. For example, threads in the system can either have the same time quantum initially assigned in field 320 or can have differing time quanta initially assigned in field 320. As another example, when a first thread is blocked because a resource owned by another thread is not available, its remaining time quantum can be transferred to the owner thread, when the owner thread is not in the same process, but is owned by the same user. In this case, the time quantum in timeleft field 322 of the first thread (in a first process) would be transferred to the second thread (in a second process), as described above. Similarly, in another embodiment, a blocked thread can share its remaining time quantum with an owner thread in a different process that belongs to a different user in a predetermined group of users. In this case, the remaining time quantum 322 of the first thread (belonging to the first user) would be transferred to the second thread (belonging to another user in the group of users), as described above.

As another example, when a first thread is blocked because a resource owned by another thread is not available, and when the owner is also not available, the remaining time quantum of the first, blocked thread can be transferred to a second thread other than the owner thread, when the second thread is not in the same process, but is owned by the same user. In this case, the remaining time quantum 322 of the first thread (in a first process) would be transferred to the second thread (in a second process), as described above. Similarly, in another embodiment, a blocked thread can share its remaining time quantum with a thread other than an owner thread in a different process that belongs to a different user in a predetermined group of users. In this case, the remaining time quantum 322 of the first thread (belonging to the first user) would be transferred to the second thread (belonging to another user in the group of users), as described above.

As another example, when a first thread is blocked because it is waiting for an event, its remaining time quantum can be transferred to a second thread, when the second thread is not in the same process, but is owned by the same user. In this case, the remaining time quantum 322 of the first thread (in a first process) would be transferred to the second thread (in a second process), as described above. Similarly, in another embodiment, a blocked thread can share its remaining time quantum with a second thread in a different process that belongs to a different user in a predetermined group of users. In this case, the time remaining quantum 322 of the first thread (belonging to the first user) would be transferred to the second thread (belonging to another user in the group of users), as described above.

Accordingly, it is intended to embrace all such alternatives, modifications and variations as fall within the spirit and scope of the appended claims and equivalents.

What is claimed is:

1. A method of sharing a time quantum between threads, comprising the steps, performed by the data processing system, of:
   determining that a first thread, which is currently being executed by a processor and which has an associated time quantum, is blocked;
   determining a next thread to be executed by the processor; and
   transferring unused time in the time quantum of the first thread to the next thread to be executed.

2. The method of claim 1, wherein the determining step includes the step of determining a next thread to be executed that is from the same process as the first thread.

3. The method of claim 1, wherein the determining step includes the step of determining a next thread to be executed that is from a different process than the first thread.

4. The method of claim 1, wherein the determining step includes the step of determining a next thread to be executed that is from a different process of a different user than the first thread.

5. The method of claim 1, wherein the transferring step includes the step of adding the unused time in the time quantum of the first thread to a time quantum of the next thread to execute.

6. The method of claim 1, wherein the transferring step includes the step of transferring the unused time in the time quantum of the first thread to a time quantum of the next thread to execute, in place of an original time quantum for the next thread to execute.

7. The method of claim 1,
   wherein the first thread in the determining step is being executed by a first processor of a plurality of processors,
   wherein the determining step determines a next thread to be executed by the first processor, and
   wherein the transferring step transfers unused time in the time quantum of the first thread to the next thread to be executed by the first processor.

8. A method of sharing a time quantum between a plurality of threads in a data processing system, comprising the steps, performed by the data processing system, of:
   initially assigning a number of tickets to the plurality of threads;
   assigning an initial priority to a thread of each of the plurality of processes in accordance with the number of tickets assigned to the threads; and
   executing the respective threads of the plurality of processes in an order indicated by the tickets assigned to the plurality of threads, so that the proportion of execution time between any two of the threads is the same as the proportion between the number of tickets of the two processes associated with the threads, the execution step including the substeps of:
      determining that a first thread, which is currently being executed and which has an associated time quantum, is blocked;
      determining a next thread to execute; and
      transferring unused time in the time quantum of the first thread to the next thread to execute.

9. The method of claim 8, wherein the data processing system includes a plurality of processors, and the data processing system has a plurality of processor slots;
   wherein the executing step includes the step of determining whether there is an available processor slot; and
   further including the step of placing a thread associated with a one of the plurality of processes on a ticket queue of the process, when there is no available processor slot, so that the thread waits on the ticket queue for an available processor slot.

10. The method of claim 8, wherein the data processing system includes a plurality of processors, and the data processing system has a plurality of processor slots;
   wherein the executing step includes the step of determining whether there is an available processor slot; and
   further including the step of placing a thread associated with a one of the plurality of processes onto a processor run queue when there is an available processor slot.

11. The method of claim 10, further including the step of calculating a priority of the thread in accordance with the number of tickets currently held by the thread's process before the thread is placed on the run queue.

12. The method of claim 11, wherein the executing step includes the steps of:
   decrementing a number of tickets of a one of the plurality of processes whose thread has just finished executing for a predetermined time period; and
   if the number of tickets for the one process is equal to zero after the decrementing step, setting the number of tickets for the one process to the initially determined number of tickets for the one process.

13. The method of claim 11, wherein the executing step includes the steps of recalculating the number of tickets held by the process; after the thread of the process has executed for the predetermined period of time.

14. The method of claim 11, wherein the executing step includes the steps of checking whether there is another thread with a higher priority; after the thread has finished executing for the predetermined period of time.

15. The method of claim 8, wherein at least one of the plurality of processes is a multi-threaded application.

16. An apparatus to allow sharing a time quantum between threads in a process, comprising:
   a portion configured to determine that a first thread, which is currently being executed by a processor and which has an associated time quantum, is blocked;

a portion configured to determine a next thread to be executed by the processor; and a portion configured to transfer unused time in the time quantum of the first thread to the next thread to be executed.

17. The apparatus of claim 16, wherein the determining portion includes a portion configured to determine a next thread to be executed that is from the same process as the first thread.

18. The apparatus of claim 16, wherein the determining portion includes a portion configured to determine a next thread to be executed that is from a different process than the first thread.

19. The apparatus of claim 16, wherein the transferring portion includes a portion configured to add the unused time in the time quantum of the first thread to a time quantum of the next thread to execute.

20. The apparatus of claim 16, wherein the transferring portion includes a portion configured to transfer the unused time in the time quantum of the first thread to a time quantum of the next thread to execute, in place of an original time quantum for the next thread to execute.

21. A computer program product, comprising:

a computer usable medium having computer readable code embodied therein for sharing a time quantum between threads in a process, the computer program product including:

computer readable program code devices configured to cause a computer to effect determining that a first thread, which is currently being executed by a processor and which has an associated time quantum, is blocked;

computer readable program code devices configured to cause a computer to effect determining a next thread to be executed by the processor; and computer readable program code devices configured to cause a computer to effect transferring unused time in the time quantum of the first thread to the next thread to be executed.

22. A computer data signal embodied in a carrier wave and representing sequences of instructions which, when executed by a processor, cause the processor to share a time quantum between threads in a process by performing the steps of:

determining that a first thread, which is currently being executed by a processor and which has an associated time quantum, is blocked;

determining a next thread to be executed by the processor; and transferring unused time in the time quantum of the first thread to the next thread to be executed.

23. The method of claim 1, further comprising:

after transferring the unused time, causing the next thread to use at least a portion of the unused time when the next thread is being executed by the processor.

24. The method of claim 23, further comprising:

after causing the next thread to use at least a portion of the unused time, restarting the first thread and enabling the first thread to use any remaining unused time that was not used by the next thread.

25. The method of claim 8, further comprising:

after transferring the unused time, causing the next thread to use at least a portion of the unused time when the next thread is being executed.

26. The method of claim 25, further comprising:

after casing the next thread to use at least a portion of the unused time, restarting the first thread and enabling he first thread to use any remaining unused that was not used by the next thread.

27. The apparatus of claim 16, further comprising:

a portion configured to cause the next thread to use at least a portion of the unused time when next thread is being executed by the processor.

28. The apparatus of claim 27, further comprising:

a portion configured to restart the first thread and enable the first thread to use any remaining unused time that was not used by the next thread.

29. The computer program product of claim 21, further comprising:

computer readable program code devices configured to cause a computer to effect causing the next thread to use at least a portion of the unused time when the next thread is being executed by the processor.

30. The computer program product of claim 21, further comprising:

computer readable program code devices configured to cause a computer to effect restarting the first thread and enabling the first thread to use any remaining unused time that was not used b the next thread.

31. The computer data signal of claim 22, where the process further comprises:

after transferring the unused time, causing the next thread to use at least a portion of the unused time when the next thread is being executed by the processor.

32. The computer data signal of claim 31, wherein the process further comprises:

after causing the next thread to use at least a portion of the unused time, restarting the first thread and enabling the first thread to use any remaining unused time that was not used by the next thread.

* * * * *

UNITED STATES PATENT AND TRADEMARK OFFICE
CERTIFICATE OF CORRECTION

PATENT NO.      : 6,272,517 B1
DATED           : August 7, 2001
INVENTOR(S)     : Kelvin K. Yue et al.

It is certified that error appears in the above-identified patent and that said Letters Patent is hereby corrected as shown below:

<u>Title page, Item [54] and Column 1, lines 1 and 2,</u>
Please change the title of the patent from "METHOD AND APPARATUS FOR SHARING A TIME QUANTUM" to -- METHOD AND APPARATUS FOR SHARING A TIME QUANTUM BETWEEN THREADS --.

Signed and Sealed this

Twenty-fifth Day of November, 2003

JAMES E. ROGAN
*Director of the United States Patent and Trademark Office*